US012658775B2

(12) United States Patent
Qin et al.

(10) Patent No.: US 12,658,775 B2
(45) Date of Patent: Jun. 16, 2026

(54) PERMANENT MAGNET ROTOR MAGNETIC COUPLING BASED ON DOUBLE-SIDED STEPPED STRUCTURE AND THREE-DIMENSIONAL HALBACH MAGNETIC POLE ARRANGEMENT

(71) Applicant: Chongqing University, Chongqing (CN)

(72) Inventors: Yi Qin, Chongqing (CN); Yubo Xu, Chongqing (CN); Fuqiang Liu, Chongqing (CN); Lei Hou, Chongqing (CN); Gangxia Han, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 255 days.

(21) Appl. No.: 18/503,608

(22) Filed: Nov. 7, 2023

(65) Prior Publication Data

US 2024/0266936 A1      Aug. 8, 2024

(30) Foreign Application Priority Data

Feb. 7, 2023      (CN) .......................... 202310075429.6

(51) Int. Cl.
*H02K 49/10*      (2006.01)

(52) U.S. Cl.
CPC ................................... *H02K 49/106* (2013.01)

(58) Field of Classification Search
CPC .... H02K 49/10; H02K 49/102; H02K 49/106; H02K 1/27; H02K 1/278; H02K 1/2783; H02K 1/279; H02K 1/2791
See application file for complete search history.

(56) References Cited

FOREIGN PATENT DOCUMENTS

| CN | 102497074 A | * | 6/2012 |
|---|---|---|---|
| CN | 202923877 U | * | 5/2013 |
| CN | 207732614 U | * | 8/2018 |

* cited by examiner

*Primary Examiner* — Oluseye Iwarere
(74) *Attorney, Agent, or Firm* — Christensen O'Connor Johnson Kindness PLLC

(57) ABSTRACT

Disclosed is a permanent magnet rotor magnetic coupling based on a double-sided stepped structure and a three-dimensional Halbach magnetic pole arrangement, including a conductor outer rotor assembly (1), and a magnet inner rotor assembly (2). The conductor outer rotor assembly (1) includes a right outer rotor assembly (3), and a bearing connected to the right outer rotor assembly (3). The right outer rotor assembly (3) includes a right conductor yoke (301), and multiple conductive rings. The magnet inner rotor assembly (2) includes a right inner rotor assembly (4), and a bearing connected to the right inner rotor assembly (4). The right inner rotor assembly (4) includes a right magnet yoke (401), and multiple magnetic rings. A stepped structure adopted by the present disclosure can make magnetic blocks have multiple polarity arrangement modes, thereby generating multiple different spatial magnetic field distributions, which are used in scenes with different power transfer requirements.

5 Claims, 17 Drawing Sheets

4'          4          2

3

306   305   304   303   302   301

4

Circumferential phase difference (The number of cycles) {The number of dislocated blocks }

30° (12) {1}

Circumferential phase difference (The number
of cycles) {The number of dislocated blocks }

30°   (12)   {2}

Circumferential phase difference (The number
of cycles) {The number of dislocated blocks }

30°  (12)  {3}

Circumferential phase difference (The number of cycles) {The number of dislocated blocks }

45° （8） {1}

Circumferential phase difference (The number
of cycles) {The number of dislocated blocks }

45°   (8)   {2}

Circumferential phase difference (The number
of cycles) {The number of dislocated blocks}

60°    (6)    {1}

PERMANENT MAGNET ROTOR MAGNETIC COUPLING BASED ON DOUBLE-SIDED STEPPED STRUCTURE AND THREE-DIMENSIONAL HALBACH MAGNETIC POLE ARRANGEMENT

CROSS-REFERENCE TO RELATED APPLICATION

This patent application claims the benefit and priority of Chinese Patent Application No. 202310075429.6, filed with the China National Intellectual Property Administration on Feb. 7, 2023, the disclosure of which is incorporated by reference herein in its entirety as part of the present application.

TECHNICAL FIELD

The present disclosure relates to the field of magnetic couplings, in particular to a permanent magnet rotor magnetic coupling based on a double-sided stepped structure and a three-dimensional Halbach magnetic pole arrangement.

BACKGROUND

At present, the well-known magnetic couplings are usually of disc and cylindrical structures. When the magnetic coupling needs speed control, the speed control modes of the disc structure and the cylindrical structure are different in form. The disc structure is to change a breath thickness between two discs, and the cylindrical structure is to change a meshing area between inner and outer cylinders.

However, there are some shortcomings in the disc and cylindrical structures. The disc structure is small in speed control width and short in speed control execution distance. When a clearance between the two discs is small, the disc structure may generate a large axial force in the torque transfer process, such that the speed control execution required by the small clearance is large, and the requirements for bearings at both ends are also high. The speed control mode of the cylindrical structure is to change the meshing area, large strip magnetic blocks are generally adopted for the structure, and such magnetic blocks are long in production cycle and high in cost.

Moreover, in the disc and cylindrical structures, the polarity arrangement of magnetic blocks is usually a single arrangement in an axial direction or radial direction, which leads to the limited combination of polarity arrangement in the conventional structure.

SUMMARY

An objective of the present disclosure is to provide a permanent magnet rotor magnetic coupling based on a double-sided stepped structure and a three-dimensional Halbach magnetic pole arrangement, which includes a non-magnetic conductor outer rotor assembly, and a magnet inner rotor assembly arranged inside the non-magnetic conductor outer rotor assembly.

The non-magnetic conductor outer rotor assembly includes a right outer rotor assembly, a left outer rotor assembly, and a bearing for connecting the right outer rotor assembly with the left outer rotor assembly.

The right outer rotor assembly includes a non-magnetic right conductor yoke, and multiple non-magnetic conductive rings.

Multiple non-magnetic conductive ring grooves are formed in the non-magnetic right conductor yoke, and the non-magnetic conductive ring grooves are arranged in a stepped manner.

The non-magnetic conductive rings are assembled inside the non-magnetic right conductor yoke through the non-magnetic conductive ring grooves. The left outer rotor assembly has a same structure as that of the right outer rotor assembly.

The magnet inner rotor assembly includes a right inner rotor assembly, a left inner rotor assembly, and a bearing for connecting the right inner rotor assembly with the left inner rotor assembly.

The right inner rotor assembly is assembled with the right outer rotor assembly. The left inner rotor assembly is assembled with the left outer rotor assembly.

The right inner rotor assembly includes a right magnet yoke, and multiple magnetic rings.

Multiple magnetic ring grooves are formed in a surface of the right magnet yoke, and the magnetic ring grooves are arranged in a stepped manner.

The magnetic rings are assembled to the surface of the right magnet yoke through the magnetic ring grooves. The left inner rotor assembly has a same structure as that of the right inner rotor assembly.

The magnetic rings include multiple magnetic blocks, and all magnetic blocks are arranged in a three-dimensional Halbach magnetic distribution manner.

When the permanent magnet rotor magnetic coupling operates, the non-magnetic conductive ring and the magnetic ring rotate with respect to each other, and the non-magnetic conductive ring generates an induced current under the action of an inherent magnetic field of the magnetic ring, and in turn generates an induced magnetic field, and an interaction between the induced magnetic field and the inherent magnetic field enables power to be transferred.

Preferably, the non-magnetic conductive ring and the magnetic ring are arranged in pairs.

Preferably, the magnetic blocks are circumferentially and continuously arranged on the surface of the right magnet yoke, so as to present magnetic rings with different diameters in different magnetic ring grooves.

Preferably, the magnetic blocks in different magnetic ring grooves have different magnetic directions.

Preferably, a magnetic field generated by the magnetic ring has a circumferential phase difference.

Preferably, the magnetic field generated by the magnetic ring has an axial phase difference.

Preferably, the number of the magnetic blocks located in different magnetic ring grooves is different.

There is no doubt about the technical effect of the present disclosure. The adopted stepped structure can make the magnetic blocks have multiple polarity arrangement modes, thus generating multiple different spatial magnetic field distributions, which can be used in scenes with different power transfer requirements.

Compared with unidirectional polarity arrangements of disc and cylindrical structures, the stepped permanent magnet rotor magnetic coupling provided by the present disclosure is in three-dimensional arrangement, and thus have a large magnetic field space divergence.

Compared with a disc type permanent magnet rotor magnetic coupling, the permanent magnet rotor magnetic coupling provided by the present disclosure has a large axial width, which makes the speed control width large, the speed control execution distance long and the applicable speed control range increased, and also alleviates the shortage of large axial force of the disc structure.

Compared with a cylindrical permanent magnet rotor magnetic coupling, the magnetic block according to the present disclosure is small, and thus the production cycle of the magnetic block is short.

Figure 1:
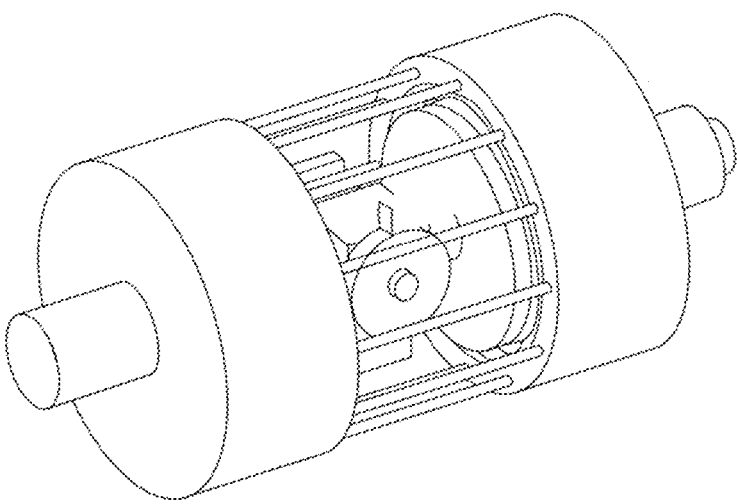
FIG. 1 is a structural diagram of a permanent magnet rotor magnetic coupling.

In the drawings: 1—non-magnetic conductor outer rotor assembly; 2—magnet inner rotor assembly; 3—right outer rotor assembly; 3'—left outer rotor assembly; 301—non-magnetic right conductor yoke; 302—fifth large non-magnetic conductive ring; 303—fourth large non-magnetic conductive ring; 304—third large non-magnetic conductive ring; 305—second large non-magnetic conductive ring; 306—first large non-magnetic conductive ring; 4—right inner rotor assembly; 4'—left inner rotor assembly; 401—right magnet yoke; 402—first large magnetic ring; 403—second large magnetic ring; 404—third large magnetic ring; 405—fourth large magnetic ring.

DETAILED DESCRIPTION OF THE EMBODIMENTS

The following further describes the present disclosure in conjunction with the embodiments, but should not be understood that that scope of the above subject matter of the present disclosure is limited to the following embodiments. Various replacements and changes made according to common technical knowledge and customary means in this art without departing from the above technical idea of the present disclosure should be included in the scope of protection of the present disclosure.

Embodiment 1

Referring to FIG. 1 through FIG. 4, a permanent magnet rotor magnetic coupling based on a double-sided stepped structure and a three-dimensional Halbach (Halbach array) magnetic pole arrangement includes a non-magnetic conductor outer rotor assembly 1, and a magnet inner rotor assembly 2 arranged inside the non-magnetic conductor outer rotor assembly 1.

The non-magnetic conductor outer rotor assembly 1 includes a right outer rotor assembly 3, a left outer rotor assembly 3', and a bearing for connecting the right outer rotor assembly 3 with the left outer rotor assembly 3'.

The right outer rotor assembly 3 includes a non-magnetic right conductor yoke 301, and multiple non-magnetic conductive rings.

Multiple non-magnetic conductive ring grooves are formed in the non-magnetic right conductor yoke 301, and the non-magnetic conductive ring grooves are arranged in a stepped manner.

The non-magnetic conductive rings are assembled inside the non-magnetic right conductor yoke 301 through the non-magnetic conductive ring grooves.

The left outer rotor assembly 3' has the same structure as that of the right outer rotor assembly 3.

The magnet inner rotor assembly 2 includes a right inner rotor assembly 4, a left inner rotor assembly 4', and a bearing for connecting the right inner rotor assembly 4 with the left inner rotor assembly 4'.

The ring inner rotor assembly 4 is assembled with the right outer rotor assembly 3. The left inner rotor assembly 4' is assembled with the left outer rotor assembly 3'.

The right inner rotor assembly 4 includes a right magnet yoke 401, and multiple magnetic rings.

Multiple magnetic rings grooves are formed in a surface of the right magnet yoke 401, and the magnetic ring grooves are arranged in a stepped manner.

The magnetic rings are assembled on the surface of the right magnet yoke 401 through the magnetic ring grooves.

The left inner rotor assembly 4' has the same structure as that of the right inner rotor assembly 4.

The magnetic rings include multiple magnetic blocks, and all magnetic blocks are arranged in a three-dimensional Halbach magnetic distribution manner.

When the permanent magnet rotor magnetic coupling operates, the non-magnetic conductive ring and the magnetic ring rotate with respect to each other, and the non-magnetic conductive ring generates an induced current under the action of an inherent magnetic field of the magnetic ring, and then generates an induced magnetic field, and an interaction between the induced magnetic field and the inherent magnetic field enables the power to be transferred.

The non-magnetic conductive rings include a fifth large non-magnetic conductive ring 302, a fourth large non-magnetic conductive ring 303, a third large non-magnetic conductive ring 304, a second large non-magnetic conductive ring 305, and a first large non-magnetic conductive ring 306.

The magnetic rings include a first large magnetic ring 402, a second large magnetic ring 403, a third large magnetic ring 404, and a fourth large magnetic ring 405.

The magnetic blocks are circumferentially and continuously arranged on the surface of the right magnet yoke 401, so as to present magnetic rings with different diameters in different magnetic ring grooves.

The magnetic blocks in different magnetic ring grooves have different magnetic directions.

A magnetic field generated by the magnetic ring has a circumferential phase difference.

Embodiment 2

A permanent magnet rotor magnetic coupling based on a double-sided stepped structure and a three-dimensional Halbach magnetic pole arrangement includes a non-magnetic conductor outer rotor assembly 1, and a magnet inner rotor assembly 2 arranged inside the non-magnetic conductor outer rotor assembly 1.

The non-magnetic conductor outer rotor assembly 1 includes a right outer rotor assembly 3, a left outer rotor assembly 3', and a bearing for connecting the right outer rotor assembly 3 with the left outer rotor assembly 3'.

The right outer rotor assembly 3 includes a non-magnetic right conductor yoke 301, and multiple non-magnetic conductive rings.

Multiple non-magnetic conductive ring grooves are formed in the non-magnetic right conductor yoke 301, and the non-magnetic conductive ring grooves are arranged in a stepped manner.

The non-magnetic conductive rings are assembled inside the non-magnetic right conductor yoke 301 through the non-magnetic conductive ring grooves.

The left outer rotor assembly 3' has the same structure as that of the right outer rotor assembly 3.

The magnet inner rotor assembly 2 includes a right inner rotor assembly 4, a left inner rotor assembly 4', and a bearing for connecting the right inner rotor assembly 4 with the left inner rotor assembly 4'.

The ring inner rotor assembly 4 is assembled with the right outer rotor assembly 3. The left inner rotor assembly 4' is assembled with the left outer rotor assembly 3'.

The right inner rotor assembly 4 includes a right magnet yoke 401, and multiple magnetic rings.

Multiple magnetic rings grooves are formed in a surface of the right magnet yoke 401, and the magnetic ring grooves are arranged in a stepped manner.

The magnetic rings are assembled on the surface of the right magnet yoke 401 through the magnetic ring grooves.

The left inner rotor assembly 4' has the same structure as that of the right inner rotor assembly 4.

The magnetic rings include multiple magnetic blocks, and all magnetic blocks are arranged in a three-dimensional Halbach magnetic distribution manner.

When the permanent magnet rotor magnetic coupling operates, the non-magnetic conductive ring and the magnetic ring rotate with respect to each other, and the non-magnetic conductive ring generates an induced current under the action of an inherent magnetic field of the magnetic ring, and then generates an induced magnetic field, and an interaction between the induced magnetic field and the inherent magnetic field enables the power to be transferred.

In general, one magnetic ring corresponds to one non-magnetic conductive ring, that is, the magnetic ring and the non-magnetic conductive ring are arranged in pairs.

The non-magnetic conductive rings include a fifth large non-magnetic conductive ring 302, a fourth large non-magnetic conductive ring 303, a third large non-magnetic conductive ring 304, a second large non-magnetic conductive ring 305, and a first large non-magnetic conductive ring 306.

The magnetic rings include a first large magnetic ring 402, a second large magnetic ring 403, a third large magnetic ring 404, and a fourth large magnetic ring 405.

The magnetic blocks are circumferentially and continuously arranged on the surface of the right magnet yoke 401, so as to present magnetic rings with different diameters in different magnetic ring grooves.

The magnetic blocks in different magnetic ring grooves have different magnetic directions.

A magnetic field generated by the magnetic ring has an axial phase difference.

Embodiment 3

A permanent magnet rotor magnetic coupling based on a double-sided stepped structure and a three-dimensional Halbach magnetic pole arrangement includes a non-magnetic conductor outer rotor assembly 1, and a magnet inner rotor assembly 2 arranged inside the non-magnetic conductor outer rotor assembly 1.

The non-magnetic conductor outer rotor assembly 1 includes a right outer rotor assembly 3, a left outer rotor assembly 3', and a bearing for connecting the right outer rotor assembly 3 with the left outer rotor assembly 3'.

The right outer rotor assembly 3 includes a non-magnetic right conductor yoke 301, and multiple non-magnetic conductive rings.

Multiple non-magnetic conductive ring grooves are formed in the non-magnetic right conductor yoke 301, and the non-magnetic conductive ring grooves are arranged in a stepped manner.

The non-magnetic conductive rings are assembled inside the non-magnetic right conductor yoke 301 through the non-magnetic conductive ring grooves.

The left outer rotor assembly 3' has the same structure as that of the right outer rotor assembly 3.

The magnet inner rotor assembly 2 includes a right inner rotor assembly 4, a left inner rotor assembly 4', and a bearing for connecting the right inner rotor assembly 4 with the left inner rotor assembly 4'.

The ring inner rotor assembly 4 is assembled with the right outer rotor assembly 3. The left inner rotor assembly 4' is assembled with the left outer rotor assembly 3'.

The right inner rotor assembly 4 includes a right magnet yoke 401, and multiple magnetic rings.

Multiple magnetic rings grooves are formed in a surface of the right magnet yoke 401, and the magnetic ring grooves are arranged in a stepped manner.

The magnetic rings are assembled on the surface of the right magnet yoke 401 through the magnetic ring grooves.

The left inner rotor assembly 4' has the same structure as that of the right inner rotor assembly 4.

The magnetic rings include multiple magnetic blocks, and all magnetic blocks are arranged in a three-dimensional Halbach magnetic distribution manner.

When the permanent magnet rotor magnetic coupling operates, the non-magnetic conductive ring and the magnetic ring rotate with respect to each other, and the non-magnetic conductive ring generates an induced current under the action of an inherent magnetic field of the magnetic ring, and then generates an induced magnetic field, and an interaction between the induced magnetic field and the inherent magnetic field enables the power to be transferred.

The non-magnetic conductive rings include a fifth large non-magnetic conductive ring 302, a fourth large non-magnetic conductive ring 303, a third large non-magnetic conductive ring 304, a second large non-magnetic conductive ring 305, and a first large non-magnetic conductive ring 306.

The magnetic rings include a first large magnetic ring 402, a second large magnetic ring 403, a third large magnetic ring 404, and a fourth large magnetic ring 405.

The magnetic blocks are circumferentially and continuously arranged on the surface of the right magnet yoke 401, so as to present magnetic rings with different diameters in different magnetic ring grooves.

The magnetic blocks in different magnetic ring grooves have different magnetic directions.

The number of the magnetic blocks in different magnetic ring grooves is different.

Embodiment 4

Figure 2:
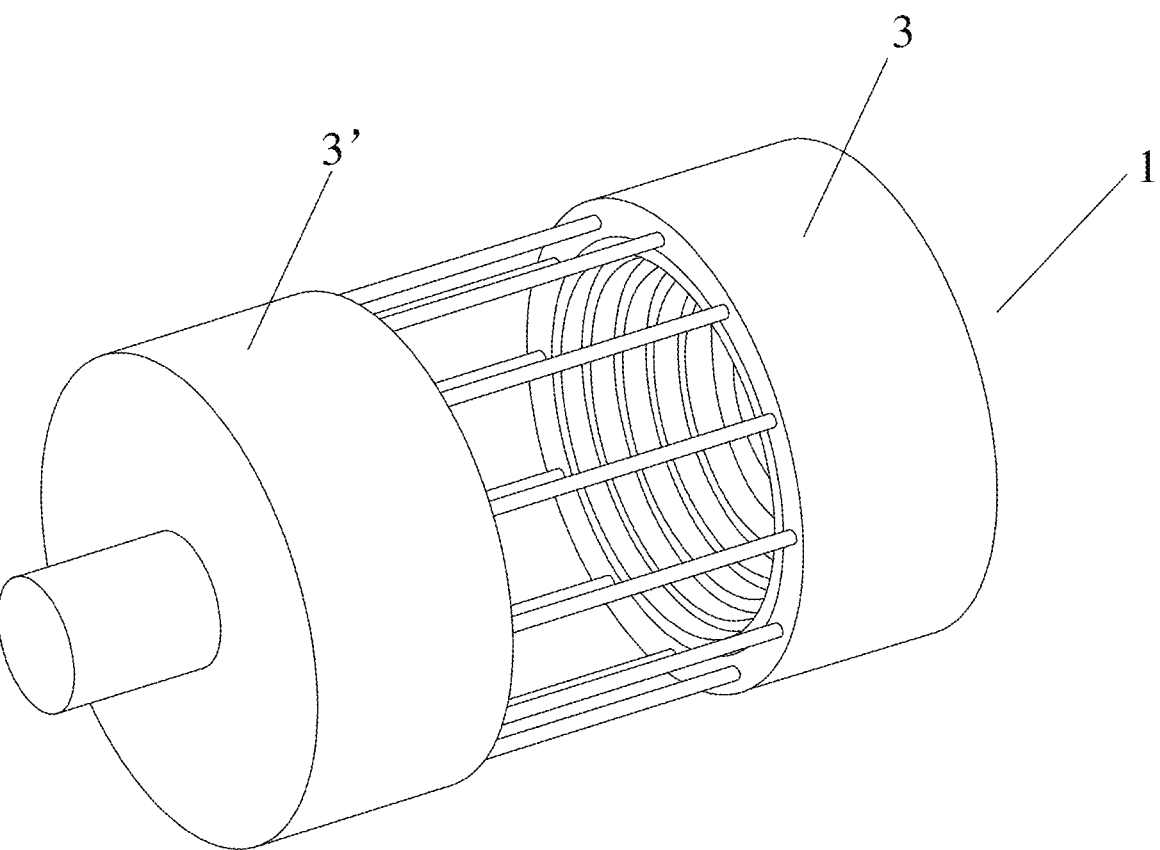
FIG. 2 is a structural diagram of a non-magnetic conductor outer rotor assembly.
Figure 3:
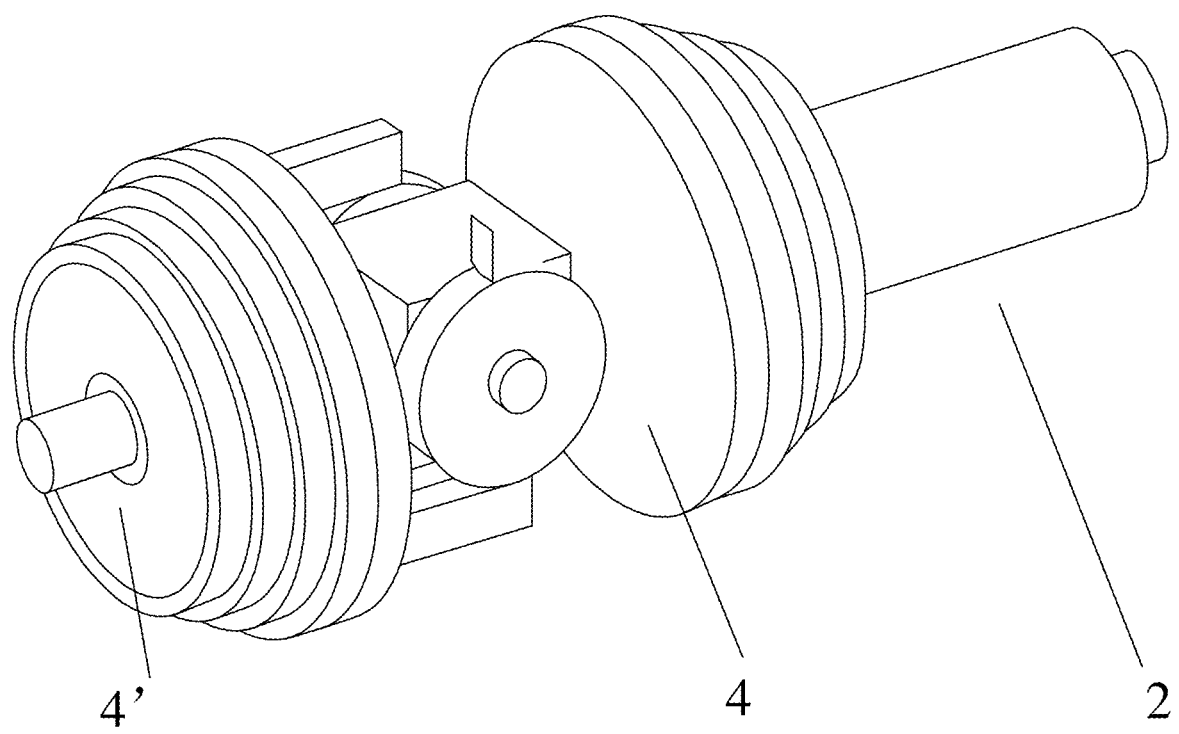
FIG. 3 is a structural diagram of a magnet inner rotor assembly.
Figure 4:
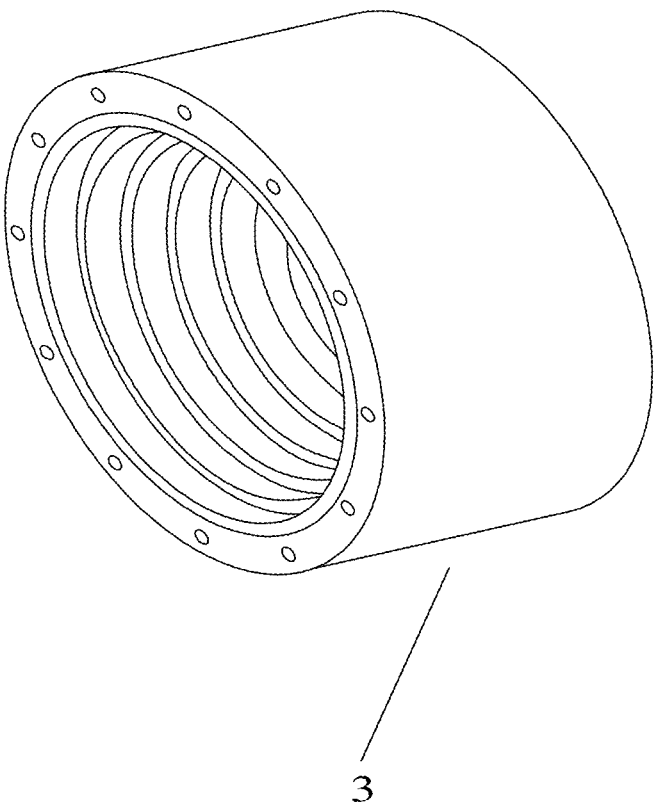
FIG. 4 is a structural diagram I of a right outer rotor assembly.
Figure 5:
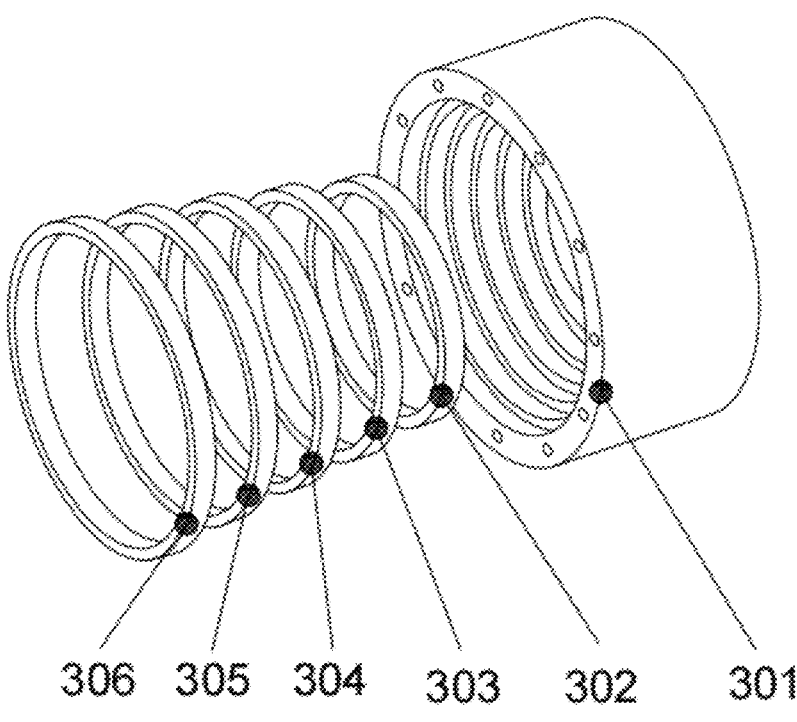
FIG. 5 is a structural diagram II of a right outer rotor assembly.
Figure 6:
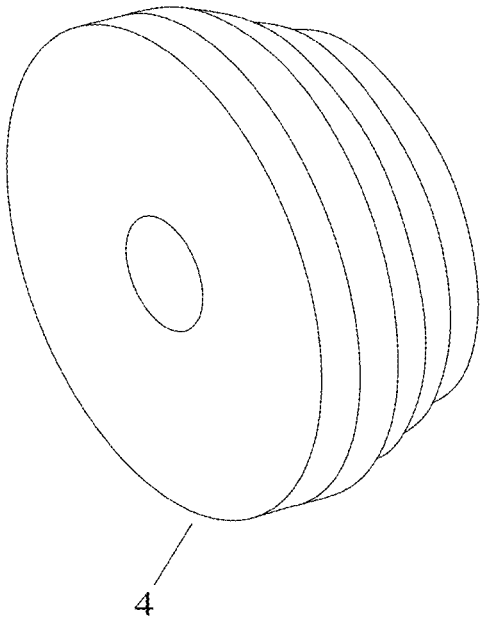
FIG. 6 is a structural diagram I of a right inner rotor assembly.
Figure 7:
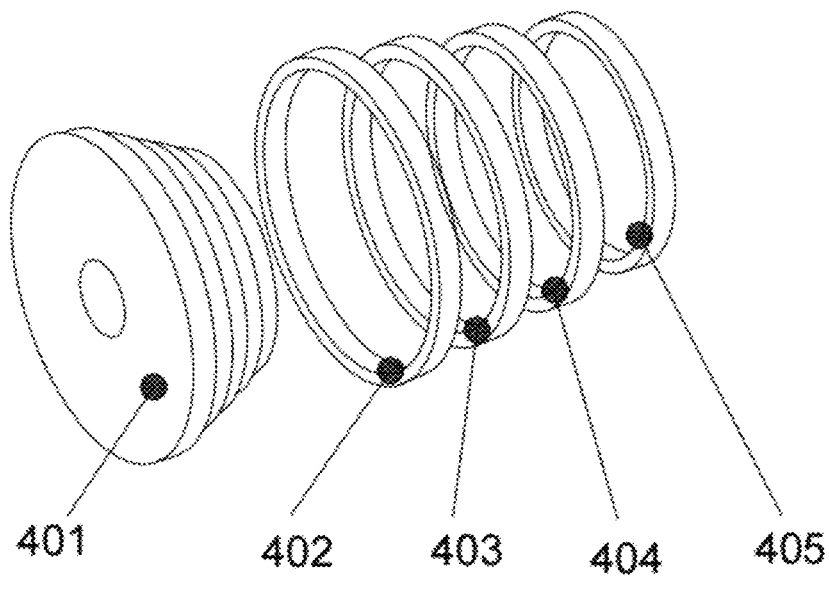
FIG. 7 is a structural diagram II of a right inner rotor assembly.

Referring to FIG. 1, a magnetic coupling assembly is composed of a non-magnetic conductor outer rotor assembly, and a magnet inner rotor assembly. The non-magnetic conductor outer rotor assembly includes a right outer rotor assembly, and the magnet inner rotor assembly includes a right inner rotor assembly, referring to FIG. 2. The right side in FIG. 2 is a decomposition diagram of the right outer rotor assembly and the right inner rotor assembly. A fifth large non-magnetic conductive ring, a fourth large non-magnetic conductive ring, a third large non-magnetic conductive ring, a second large non-magnetic conductive ring and a first large non-magnetic conductive ring are installed on a non-magnetic right conductor yoke. A first large magnetic ring, a second large magnetic ring, a third magnetic ring and a fourth magnetic ring are installed on a right magnet yoke. In the magnetic coupling assembly, the right outer rotor assembly corresponds to the right inner rotor assembly, and the non-magnetic conductive rings on the non-magnetic right conductor yoke also correspond to the magnetic rings on the right magnet yoke, which are component for achieving the drive principle of the magnetic coupling. In the components for achieving the principle, a structural combination mode of the non-magnetic conductor yoke and the non-magnetic conductive rings in the right outer rotor assembly is stepped, and a structural combination mode of the magnet yoke and the magnetic rings in the right inner rotor assembly is also stepped.

Figure 8:
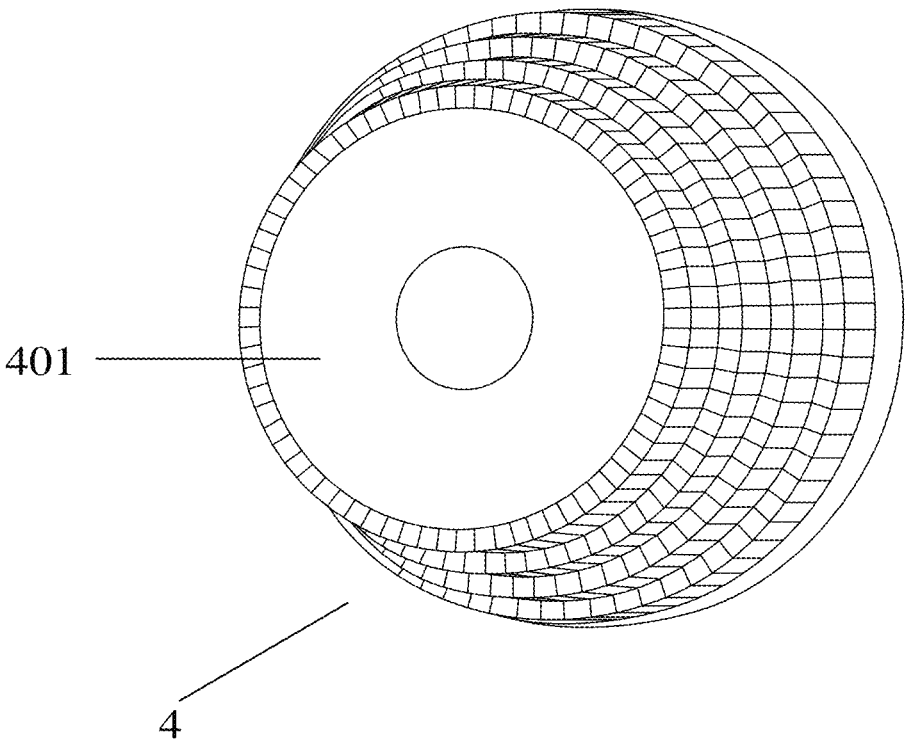
FIG. 8 shows arrangement details I of small magnetic blocks on a magnet yoke.
Figure 9:
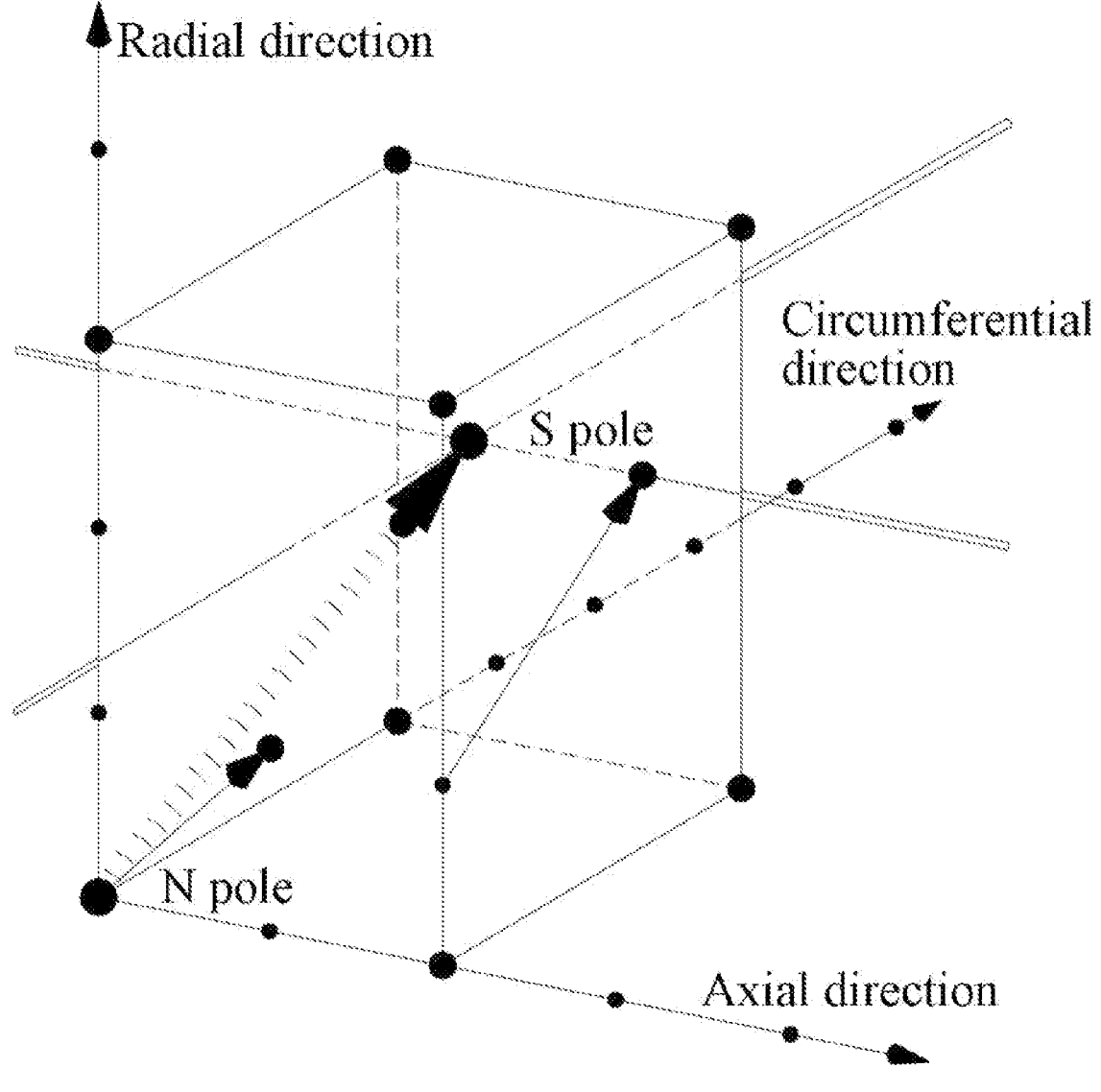
FIG. 9 is a schematic diagram I of polar direction decomposition of small magnetic blocks.
Figure 10:
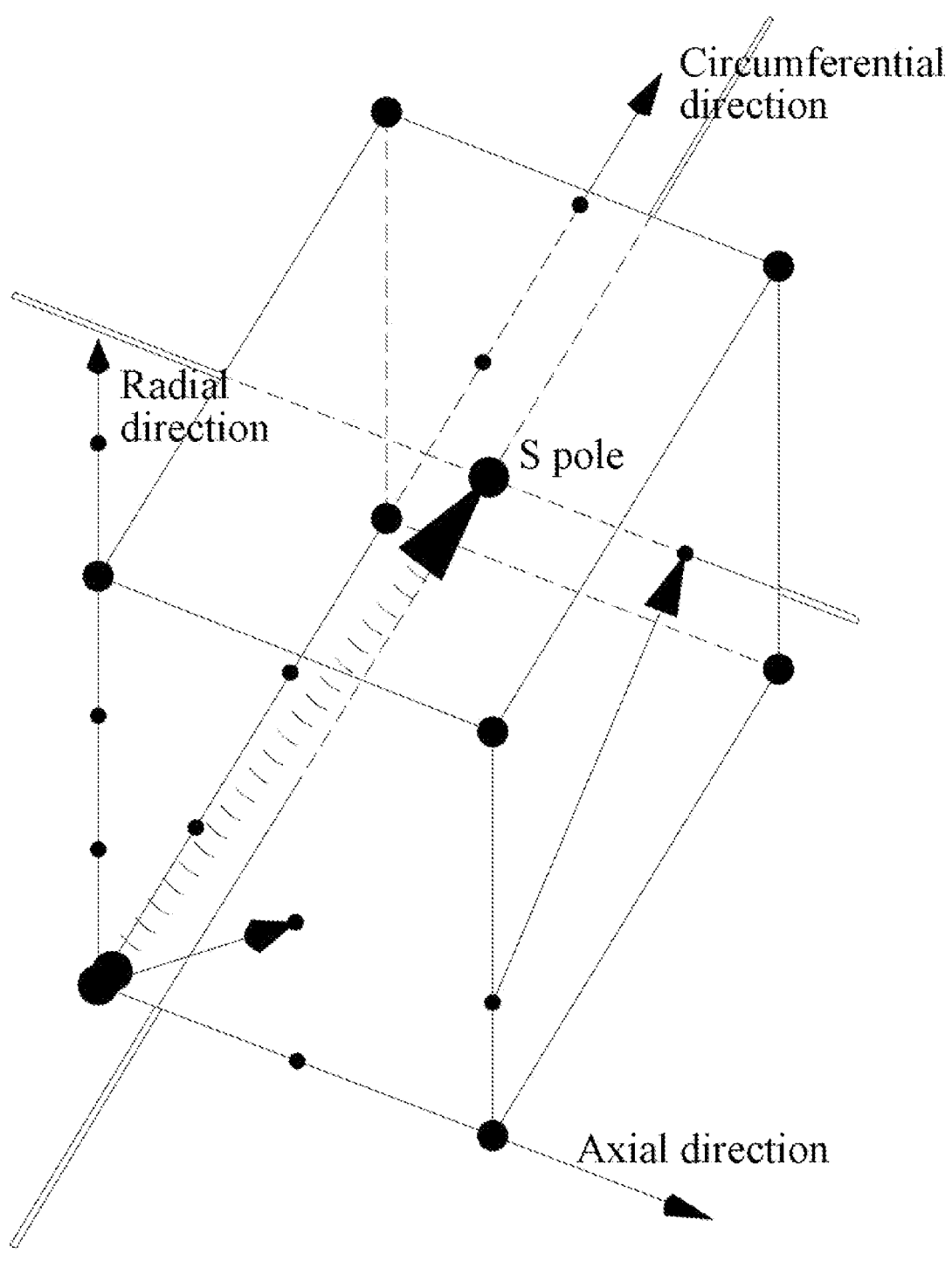
FIG. 10 is a schematic diagram II of polar direction decomposition of small magnetic blocks.
Figure 11A:
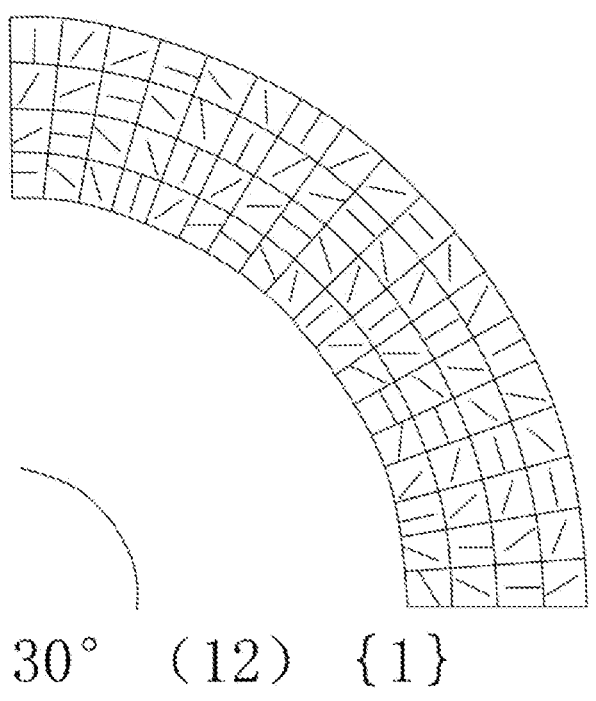
FIG. 11A shows a Halbach arrangement with a circumferential phase difference of 30°, one dislocation block, and twelve partition blocks in one cycle of Halbach arrangement.
Figure 11B:
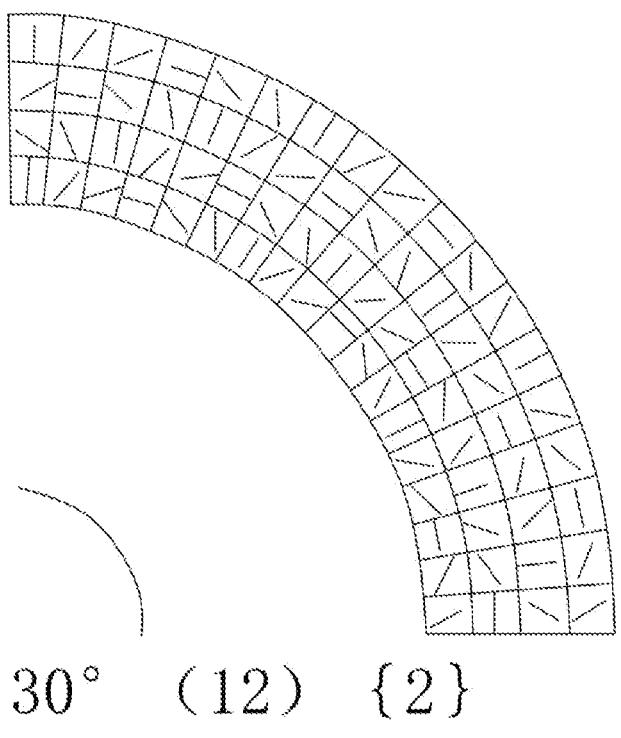
FIG. 11B shows a Halbach arrangement with a circumferential phase difference of 30°, two dislocated blocks, and twelve partition blocks in one cycle of Halbach arrangement.
Figure 11C:
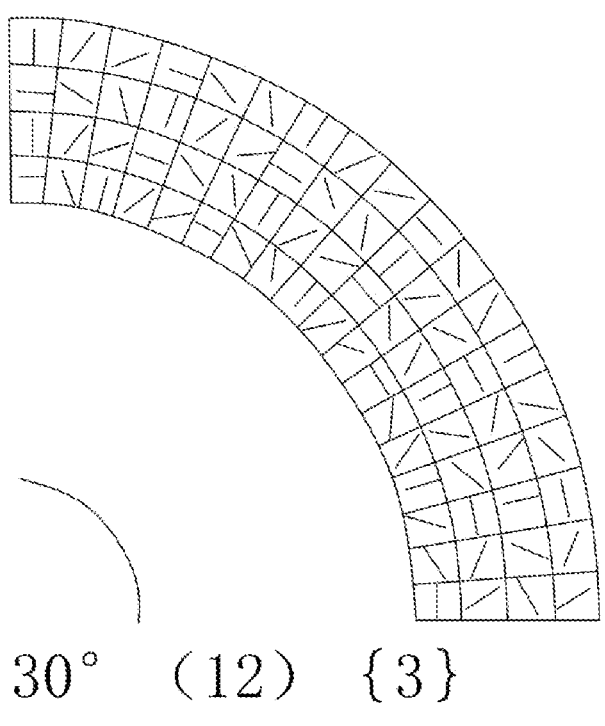
FIG. 11C shows a Halbach arrangement with a circumferential phase difference of 30°, three dislocated blocks, and twelve partition blocks in one cycle of Halbach arrangement.
Figure 12A:
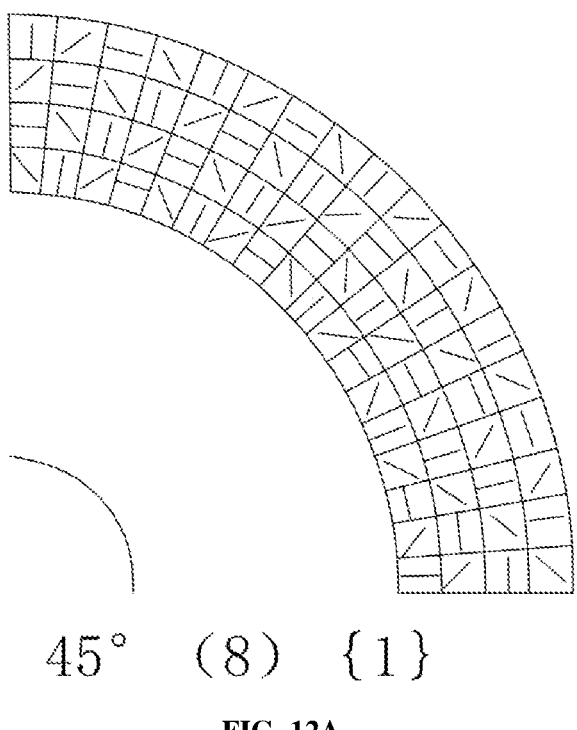
FIG. 12A shows a Halbach arrangement with a circumferential phase difference of 45°, one dislocated block, and eight partition blocks in one cycle of Halbach arrangement.
Figure 12B:
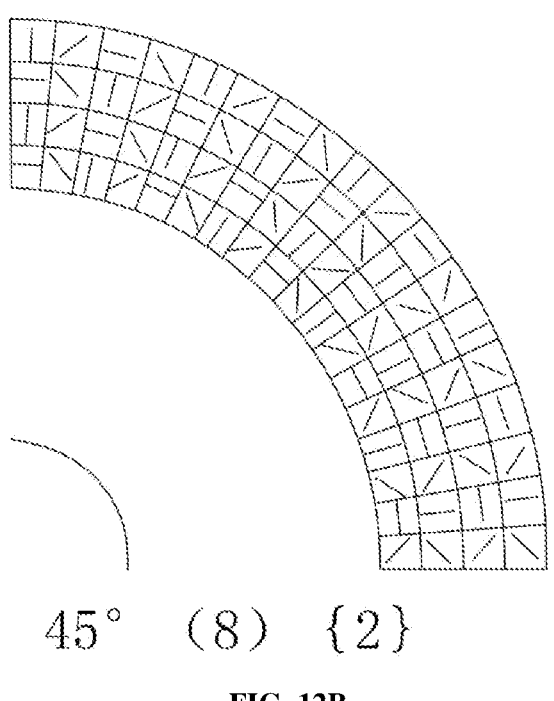
FIG. 12B shows a Halbach arrangement with a circumferential phase difference of 45°, two dislocated blocks, and six partition blocks in one cycle of Halbach arrangement.
Figure 13:
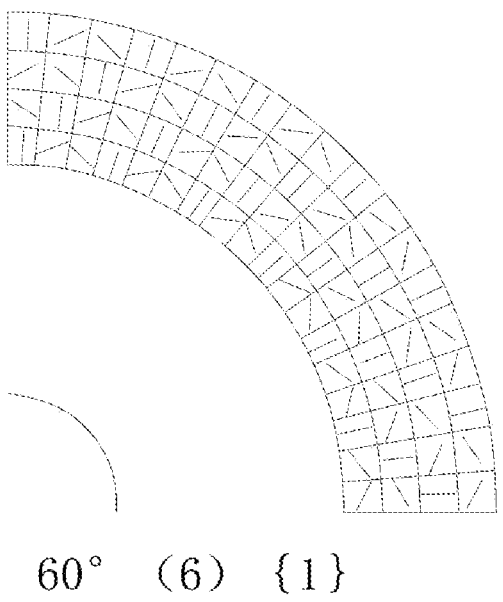
FIG. 13 shows a Halbach arrangement with a circumferential phase difference of 60°, one dislocated block, and six partition blocks in one cycle of Halbach arrangement.
Figure 14A:
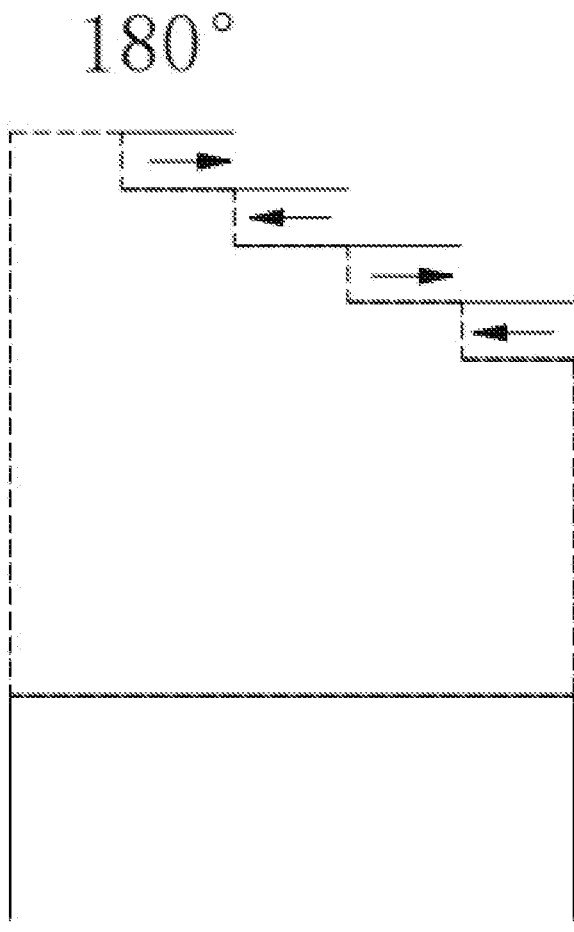
FIGS. 14A-E show Halbach arrangements with axial phase difference of 180°, 90°, 60°, 450 and 30°.
Figure 14B:
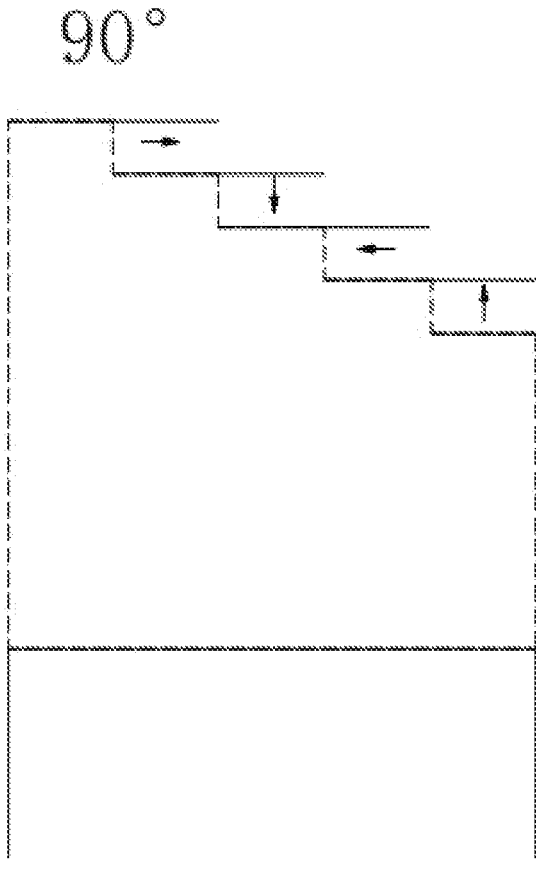
Figure 14C:
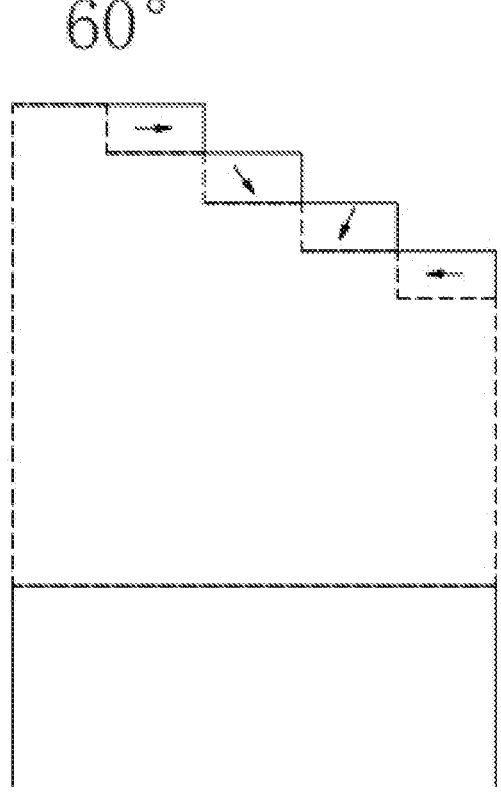
Figure 14D:
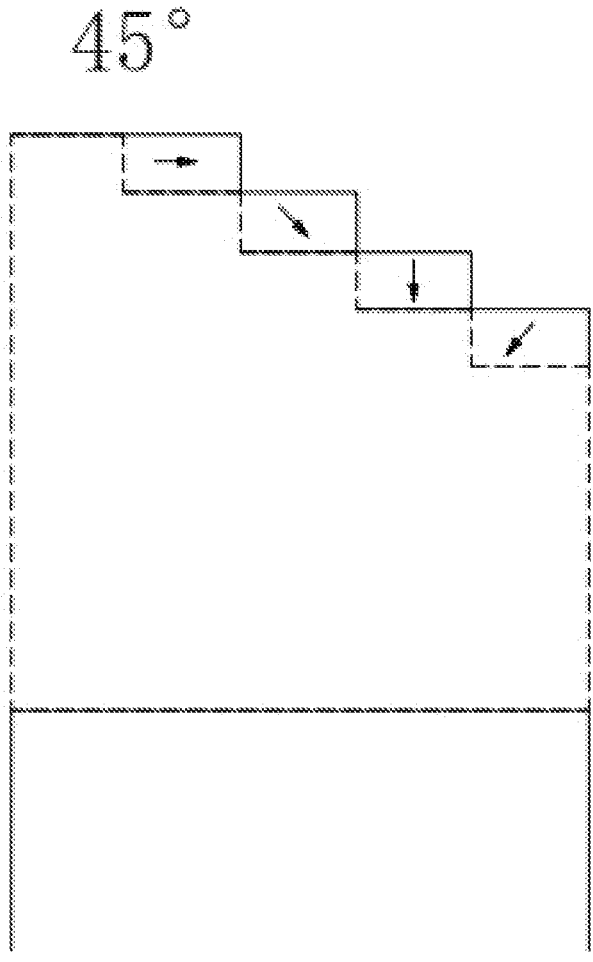
Figure 14E:
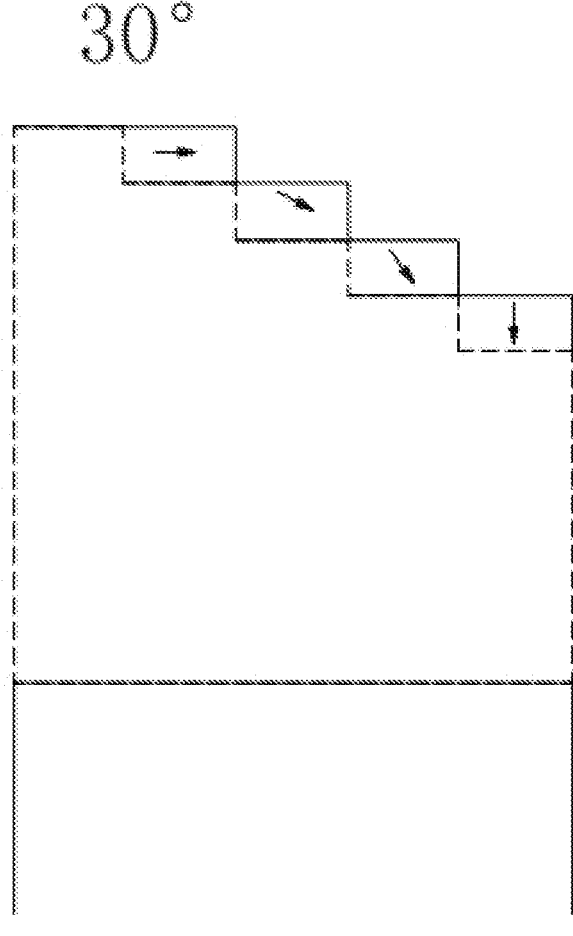

Referring to the arrangement details of small magnetic blocks on the magnet yoke in FIG. 8. The small magnetic blocks are circumferentially and continuously arranged on a stepped surface of the magnet yoke, so as to present the magnetic rings with different diameters on different stepped surfaces. The magnetic directions of the small magnetic blocks at different positions of the stepped magnet yoke may be different. FIG. 9 and FIG. 10 are schematic diagrams of polar direction decomposition of the small magnetic blocks, in which a gray cube represents a small magnetic block, a thick arrow in the cube represents a magnetic pole direction, and an arrow on a cube surface represents the decomposition of the magnetic pole direction in a circumferential direction and an axial direction.

Referring to FIGS. 11A-C through FIGS. 14A-E, an example III illustrating the Halbach arrangement with polar decomposition in the circumferential direction and an example IV illustrating the Halbach arrangement with polar decomposition in the axial direction are provided, and stepped magnetic blocks are combined and arranged to form a three-dimensional Halbach magnetic distribution. The polar arrangement modes can be differentiated by the circumferential phase difference, the number of interlayer dislocated blocks, and the axial phase difference. In the example III illustrating the Halbach arrangement with polar decomposition in the circumferential direction, examples with the circumferential phase difference of 30°, 450 and 60°, and one/two/three dislocated blocks, one/two dislocated blocks, and one dislocated block respectively are listed. In the example IV illustrating the Halbach arrangement with polar decomposition in the axial direction, examples with the axial phase difference of 180°, 90°, 60°, 45° and 30° are listed.

An operating principle is described as follows: The basic operating principle of the magnetic coupling is that when the magnetic ring and the non-magnetic conductive ring rotates with respect to each other, the non-magnetic conductive ring generates an induced current under the action of an inherent magnetic field of the magnetic ring, and in turn generates an induced magnetic field, and an interaction between the induced magnetic field and the inherent magnetic field enables the power to be transferred. The premise of generating the induced magnetic field is that there is an inherent magnetic field, and different distributions of the inherent magnetic field can generate different induced magnetic fields, which also makes the effect of power transfer different. In the stepped structure, the arrangement mode of the magnetic blocks is more than the unidirectional arrangement of disc and cylindrical structures, and the magnetic blocks can be arranged in a three-dimensional manner. Different circumferential and axial Halbach arrangements can be combined to produce a variety of three-dimensional magnetic field spaces, which can be used in scenes with different power transfer requirements.

Embodiment 5

A permanent magnet rotor magnetic coupling based on a double-sided stepped structure and a three-dimensional Halbach magnetic pole arrangement includes a non-magnetic conductor outer rotor assembly 1, and a magnet inner rotor assembly 2 arranged inside the non-magnetic conductor outer rotor assembly 1.

The non-magnetic conductor outer rotor assembly 1 includes a right outer rotor assembly 3, a left outer rotor assembly 3', and a bearing for connecting the right outer rotor assembly 3 with the left outer rotor assembly 3'.

The right outer rotor assembly 3 includes a non-magnetic right conductor yoke 301, and multiple non-magnetic conductive rings.

Multiple non-magnetic conductive ring grooves are formed in the non-magnetic right conductor yoke 301, and the non-magnetic conductive ring grooves are arranged in a stepped manner.

The non-magnetic conductive rings are assembled inside the non-magnetic right conductor yoke 301 through the non-magnetic conductive ring grooves.

The left outer rotor assembly 3' has the same structure as that of the right outer rotor assembly 3.

The magnet inner rotor assembly 2 includes a right inner rotor assembly 4, a left inner rotor assembly 4', and a bearing for connecting the right inner rotor assembly 4 with the left inner rotor assembly 4'.

The ring inner rotor assembly 4 is assembled with the right outer rotor assembly 3. The left inner rotor assembly 4' is assembled with the left outer rotor assembly 3'.

The right inner rotor assembly 4 includes a right magnet yoke 401, and multiple magnetic rings.

Multiple magnetic rings grooves are formed in a surface of the right magnet yoke 401, and the magnetic ring grooves are arranged in a stepped manner.

The magnetic rings are assembled on the surface of the right magnet yoke 401 through the magnetic ring grooves.

The left inner rotor assembly 4' has the same structure as that of the right inner rotor assembly 4.

The magnetic rings include multiple magnetic blocks, and all magnetic blocks are arranged in a three-dimensional Halbach magnetic distribution manner.

When the permanent magnet rotor magnetic coupling operates, the non-magnetic conductive ring and the magnetic ring rotate with respect to each other, and the non-magnetic conductive ring generates an induced current under the action of an inherent magnetic field of the magnetic ring, and then generates an induced magnetic field, and an interaction between the induced magnetic field and the inherent magnetic field enables the power to be transferred.

Embodiment 6

A permanent magnet rotor magnetic coupling based on a double-sided stepped structure and a three-dimensional Halbach magnetic pole arrangement is provided, the main content of which is described in Embodiment 5, in which the non-magnetic conductive ring and the magnetic ring are arranged in pairs.

Embodiment 7

A permanent magnet rotor magnetic coupling based on a double-sided stepped structure and a three-dimensional Halbach magnetic pole arrangement is provided, the main content of which is described in Embodiment 5, in which the magnetic blocks are circumferentially and continuously arranged on the surface of the right magnet yoke 401, so as to present the magnetic rings with different diameters in different magnetic ring grooves.

Embodiment 8

A permanent magnet rotor magnetic coupling based on a double-sided stepped structure and a three-dimensional Halbach magnetic pole arrangement is provided, the main content of which is described in Embodiment 5, in which the magnetic blocks in different magnetic ring grooves have different magnetic directions.

Embodiment 9

A permanent magnet rotor magnetic coupling based on a double-sided stepped structure and a three-dimensional Halbach magnetic pole arrangement is provided, the main content of which is described in Embodiment 5, in which a magnetic field generated by the magnetic ring has a circumferential phase difference.

Embodiment 10

A permanent magnet rotor magnetic coupling based on a double-sided stepped structure and a three-dimensional Halbach magnetic pole arrangement is provided, the main content of which is described in Embodiment 5, in which a magnetic field generated by the magnetic ring has an axial phase difference.

Embodiment 11

A permanent magnet rotor magnetic coupling based on a double-sided stepped structure and a three-dimensional Halbach magnetic pole arrangement is provided, the main content of which is described in Embodiment 5, in which the number of the magnetic blocks in different magnetic ring grooves is different.

What is claimed is:

1. A permanent magnet rotor magnetic coupling based on a double-sided stepped structure and a three-dimensional Halbach magnetic pole arrangement, comprising a non-magnetic conductor outer rotor assembly (1), and a magnet inner rotor assembly (2) arranged inside the non-magnetic conductor outer rotor assembly (1), wherein the non-magnetic conductor outer rotor assembly (1) comprises a right outer rotor assembly (3), a left outer rotor assembly (3') and a first bearing for connecting the right outer rotor assembly (3) with the left outer rotor assembly (3');

the right outer rotor assembly (3) comprises a non-magnetic right conductor yoke (301), and a plurality of non-magnetic conductive rings;

a plurality of non-magnetic conductive ring grooves are formed in the non-magnetic right conductor yoke (301), and the non-magnetic conductive ring grooves are arranged in a stepped manner;

the non-magnetic conductive rings are assembled inside the non-magnetic right conductor yoke (301) through the non-magnetic conductive ring grooves;

the left outer rotor assembly (3') has a same structure as that of the right outer rotor assembly (3);

the magnet inner rotor assembly (2) comprises a right inner rotor assembly (4), a left inner rotor assembly (4') and a second bearing for connecting the right inner rotor assembly (4) with the left inner rotor assembly (4');

the right inner rotor assembly (4) is assembled with the right outer rotor assembly (3); and the left inner rotor assembly (4') is assembled with the left outer rotor assembly (3');

the right inner rotor assembly (4) comprises a right magnet yoke (401), and a plurality of magnetic rings;

a plurality of magnetic ring grooves are formed in a surface of the right magnet yoke (401), and the magnetic ring grooves are arranged in a stepped manner;

the magnetic rings are assembled to the surface of the right magnet yoke (401) through the magnetic ring grooves;

the left inner rotor assembly (4') has a same structure as that of the right inner rotor assembly (4);

the magnet inner rotor assembly (2) is coupled with the non-magnetic conductor outer rotor assembly (1); wherein the non-magnetic conductive ring and the magnetic ring are arranged in pairs;

each of the plurality of magnetic rings comprises a plurality of magnetic blocks, and all magnetic blocks are arranged in a three-dimensional Halbach magnetic distribution manner; wherein the magnetic blocks in different magnetic ring grooves have different magnetic directions; and when the permanent magnet rotor magnetic coupling operates, the non-magnetic conductive ring and the magnetic ring rotate with respect to each other, and the non-magnetic conductive ring generates an induced current under the action of an inherent magnetic field of the magnetic ring, and in turn generates an induced magnetic field, and an interaction between the induced magnetic field and the inherent magnetic field enables power to be transferred.

2. The permanent magnet rotor magnetic coupling based on a double-sided stepped structure and a three-dimensional Halbach magnetic pole arrangement according to claim 1, wherein the magnetic blocks are circumferentially and continuously arranged on the surface of the right magnet yoke (401), so as to present magnetic rings with different diameters in different magnetic ring grooves.

3. The permanent magnet rotor magnetic coupling based on a double-sided stepped structure and a three-dimensional Halbach magnetic pole arrangement according to claim 1, wherein a magnetic field generated by the magnetic ring has a circumferential phase difference.

4. The permanent magnet rotor magnetic coupling based on a double-sided stepped structure and a three-dimensional Halbach magnetic pole arrangement according to claim 1, wherein the magnetic field generated by the magnetic ring has an axial phase difference.

5. The permanent magnet rotor magnetic coupling based on a double-sided stepped structure and a three-dimensional Halbach magnetic pole arrangement according to claim 1, wherein the number of the magnetic blocks located in different magnetic ring grooves is different.

* * * * *